Jan. 28, 1958 B. O. AUSTIN 2,821,666
CONTROL AND PROTECTION OF ELECTRIC POWER SYSTEMS
Filed Feb. 19, 1954 3 Sheets-Sheet 1

WITNESSES:
Robert C. Baird
Wm. B. Sellers

INVENTOR
Bascum O. Austin.
BY
ATTORNEY

Jan. 28, 1958 B. O. AUSTIN 2,821,666
CONTROL AND PROTECTION OF ELECTRIC POWER SYSTEMS
Filed Feb. 19, 1954 3 Sheets-Sheet 2

Jan. 28, 1958     B. O. AUSTIN     2,821,666
CONTROL AND PROTECTION OF ELECTRIC POWER SYSTEMS
Filed Feb. 19, 1954     3 Sheets-Sheet 3

United States Patent Office 2,821,666
Patented Jan. 28, 1958

2,821,666

CONTROL AND PROTECTION OF ELECTRIC POWER SYSTEMS

Bascum O. Austin, Lima, Ohio, assignor to Westinghouse Electric Corporation, East Pittsburgh, Pa., a corporation of Pennsylvania Application February 19, 1954, Serial No. 411,469

19 Claims. (Cl. 317—13)

The present invention relates to the control and protection of electric power systems, and more particularly to the control and protection of a direct-current generator operating in parallel with other generators.

While it will be obvious that the invention is not limited to any specific application, it is especially suitable for use in direct-current aircraft electrical systems. Such systems are utilized to supply the electrical loads on airplanes and consist essentially of a plurality of generators driven by the airplane main engines and connected in parallel to a load bus. Maintenance of an adequate power supply and continuity of service are of the greatest importance on an airplane, and the electrical system must have a very high degree of reliability. It is also desirable for its operation to be as fully automatic as possible. In order to obtain the desired reliability, the system must include protective means for protecting the system against any type of faults, or abnormal operation of any of the generators, and a faulty generator must be removed from the bus as rapidly as possible, and without interrupting the power supply to the bus from the remaining generators.

The principal object of the present invention is to provide an improved control and protective system of the type described which includes as one of its novel features a circuit control device combining the functions of a main contactor, for connecting a generator to a bus and for disconnecting it, and of a high-speed circuit breaker for disconnecting the generator substantially instantaneously under fault conditions.

Another object of the invention is to provide a control and protective system for a direct-current generator in which the generator is disconnected from the bus in response to reverse current flow from the bus to the generator, and in which back-up protection is provided for instantaneously disconnecting the generator and deenergizing its field circuit if the primary reverse current protection fails to operate.

A further object of the invention is to provide a control and protective system for a direct-current generator in which the generator is connected to a load bus by a circuit control device or contactor of novel construction, which is controlled by a differential relay to connect the generator to the bus when the generator voltage exceeds the bus voltage and to disconnect the generator in response to reverse current, the contactor also including instantaneous tripping means to effect opening of the contactor substantially instantaneously, and the system including an overvoltage relay which actuates the instantaneous tripping means in response to generator overvoltage to remove the generator from the bus before the contactors of other generators operating in parallel can open in response to the reverse current caused by the overvoltage, thus avoiding even momentary disconnection of the good generators.

A still further object of the invention is to provide a contactor or circuit control device which is moved to closed position by a closing coil and held in closed position by a holding coil, and which also has instantaneous tripping means for releasing the contact actuating element of the contactor independently of the holding coil, to effect opening of the contacts in a much shorter time than is required for the contacts to be opened by deenergization of the holding coil.

Other objects and advantages of the invention will be apparent from the following detail description, taken in connection with the accompanying drawings, in which, Figure 1 is a schematic wiring diagram showing a preferred embodiment of the system;

Figure 1:
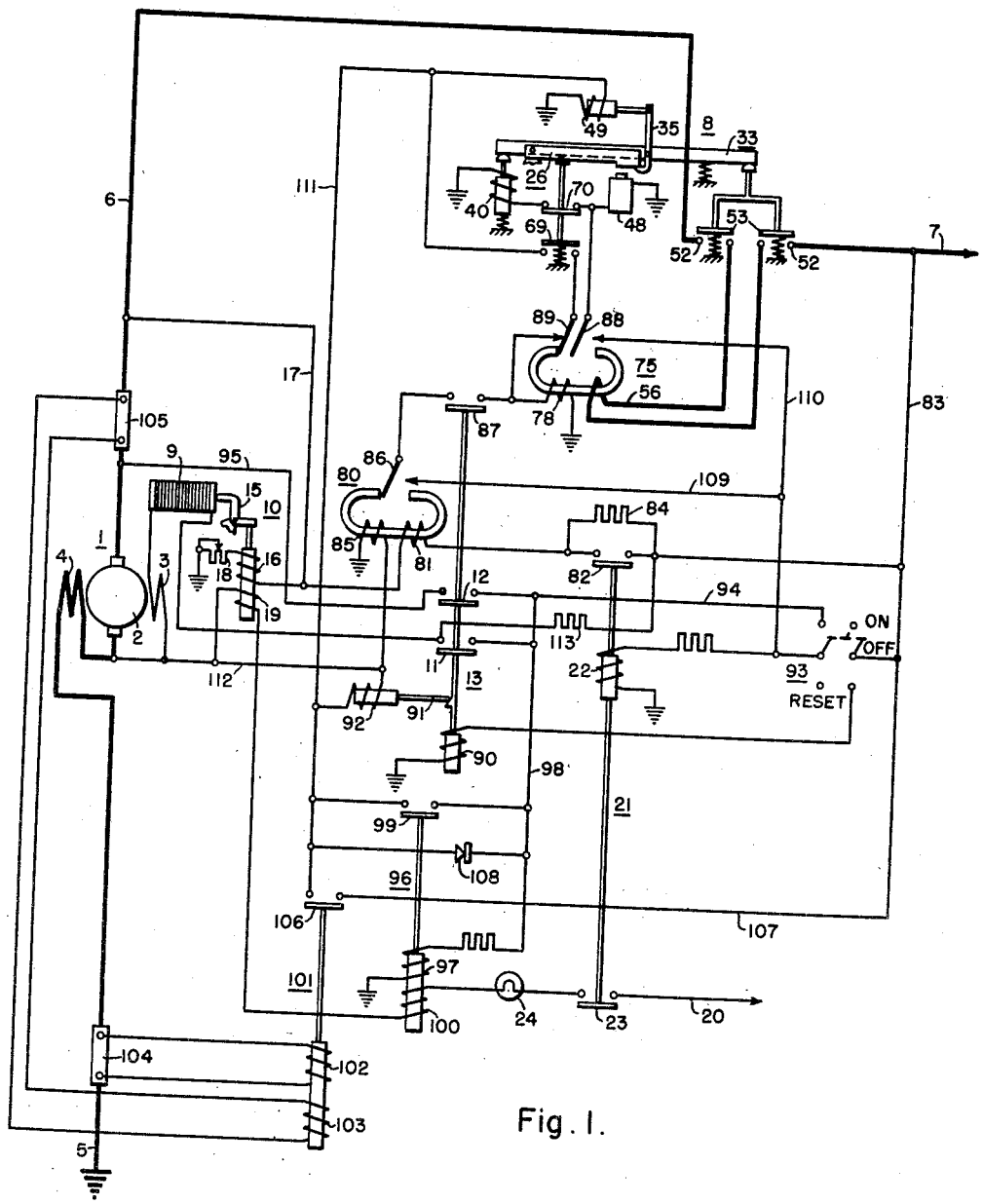
Figure 2:
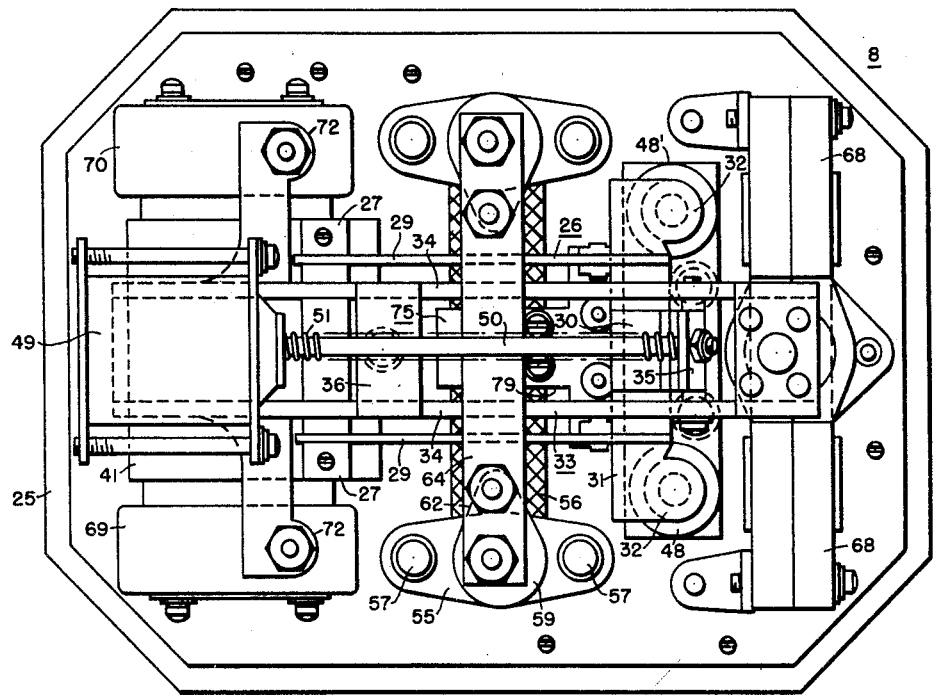
Fig. 2 is a top plan view of a novel contactor which forms an essential part of the system.
Figure 3:
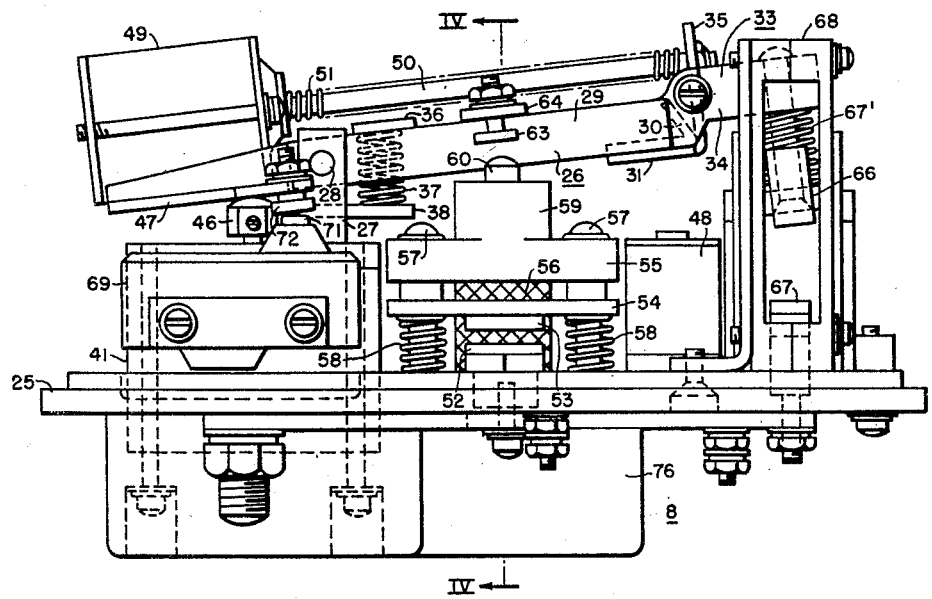
Fig. 3 is a side view of the contactor.
Figure 4:
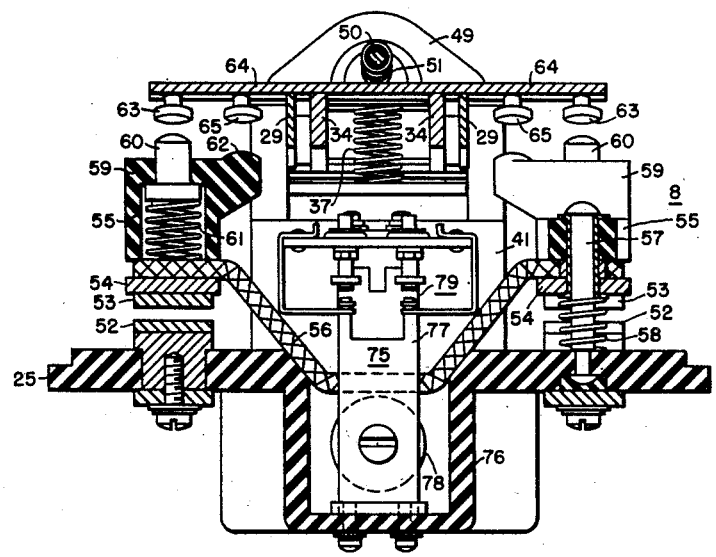
Fig. 4 is a transverse sectional view approximately on the line IV—IV of Fig. 3; and, Fig. 5 is a side view of the contactor, partly in section and with some parts omitted, showing the position of the contactor when the instantaneous tripping means has been actuated.

The invention is shown in the drawings embodied in a control and protective system for a direct-current generator 1, which may be driven by any suitable prime mover (not shown), such as an airplane main engine. The generator 1 has an armature member 2, and a shunt field winding 3 and series field winding 4. The series field winding 4 is connected in series with one terminal of the generator 1, preferably the negative terminal, the other end of the series field winding 4 being connected to ground at 5. The other, or positive, terminal of the generator 1 is connected to a feeder conductor 6, which is connected to a load bus 7 by means of a contactor 8. The loads supplied by the generator are, of course, connected between the bus 7 and ground.

The shunt field winding 3 is connected across the generator armature 2, one end of the field winding 3 being connected directly to the negative terminal of the generator. The other end of the field winding 3 is connected to a variable resistor 9 of a voltage regulator 10 and through contacts 11 and 12 in series of a field relay 13 back to the positive side of the generator. The voltage regulator 10 may be of any suitable or usual type, and is shown as a carbon pile regulator having a variable resistor 9 consisting of a carbon pile, the resistance of which is varied by means of a pressure mechanism 15 of any suitable type actuated by a coil 16. The coil 16 of the voltage regulator is connected to the positive side of the generator 1 through a conductor 17, the other side of the coil being connected to ground through a voltage-adjusting rheostat 18, so that the coil 16 responds to the generator voltage and varies the resistance in series with the shunt field winding 3 to maintain constant generator voltage.

It will be understood that the complete aircraft system includes a plurality of generators similar to the generator 1, connected in parallel to the load bus 7 by means of contactors similar to the contactor 8, each of the generators being provided with the control and protective means described hereinafter in connection with the generator 1. The other generators of the system have not been shown in Fig. 1 in order to avoid unnecessary complication of the drawing. In order to maintain proper load division between the several generators operating in parallel, the voltage regulator 10 is provided with a paralleling coil 19, which is connected to the negative terminal of the generator 1 to respond to the voltage across the series field winding 4, and thus to the load on the generator. The other end of the coil 19 is connected to an equalizer bus 20 to which similar coils on the voltage regulators of the other parallel-connected generators are also connected.

It will be understood that as long as the loads on all the generators of the system are equal, no current will flow in the equalizer bus, but if the load becomes unequally divided, current will flow in a direction to cause the regulators of the various generators to adjust the generator voltages in such a manner as to restore the proper division of load.

An equalizer relay 21 is provided having an operating coil 22 and contacts 23 which are connected between the coil 19 and the equalizer bus 20 to disconnect the coil 19 from the equalizer bus when the generator 1 is not in operation, to prevent pulling down the voltage of the other generators when the generator 1 is idle. A ballast lamp 24, or other non-linear resistor, is preferably also connected in the equalizer circuit to limit the equalizer current under conditions of excessive load unbalance.

The main contactor 8, which connects the generator 1 to the load bus 7, is of novel construction, and is shown in detail in Figs. 2 through 5. The contactor 8 has an insulating base 25 on which is pivotally mounted a movable member 26. The movable member is pivoted on vertical supports 27 on the base by means of a pivot pin 28, and consists of two side arms 29 supported on the pivot pin 28 and joined at the opposite end by an angular latch bar 30 and a transverse member 31 which extends outwardly on opposite sides of the movable member and terminates in circular end portions 32.

A movable lever 33 is pivotally mounted on the movable member 26, preferably by means of the pivot pin 28, and comprises two side members 34 disposed between the arms 29 and mounted on the pivot pin. A latch member 35 is pivotally secured between the side members 34 of the lever 33 in position to engage the latch bar 30 of the movable member 26, so as to normally latch the lever 33 to the movable member 26 for movement therewith. A cross member 36 connects the side members 34 adjacent the pivot 28, and a compression spring 37 is supported on a fixed bracket 38 and engages the cross member 36 to bias the movable member 26 in a counterclockwise direction about the pivot 28.

The contactor is actuated to closed position by means of a closing coil 40 contained in a housing 41 on the base 25. The coil 40 has a stationary core 42, and a movable armature 43 attached to a plunger 44 which extends through a central passage in the core 42. A spring 45 may be provided to adjust the force required to actuate the armature. A cap 46 is placed on the upper end of the plunger 44 in position to engage a platform 47 extending between the ends of the side members 34 of the lever 33. It will be seen that when the coil 40 is energized, the armature 43 is drawn towards it and raises the plunger 44 and cap 46, thus moving the lever 33 and movable member 26 in a clockwise direction about the pivot 28 to actuate the contactor to closed position against the opposing force of the spring 37.

The contactor is held in closed position by means of a holding coil 48, which is preferably divided into two series-connected coils 48 and 48' mounted on the base 25 on opposite sides of the movable member 26 in position to cooperate with the circular end portions 32 of the transverse member 31, which serve as armatures, so that when the holding coil is energized, the contactor is held in its actuated position, and the closing coil 40 can be deenergized.

Figure 5:
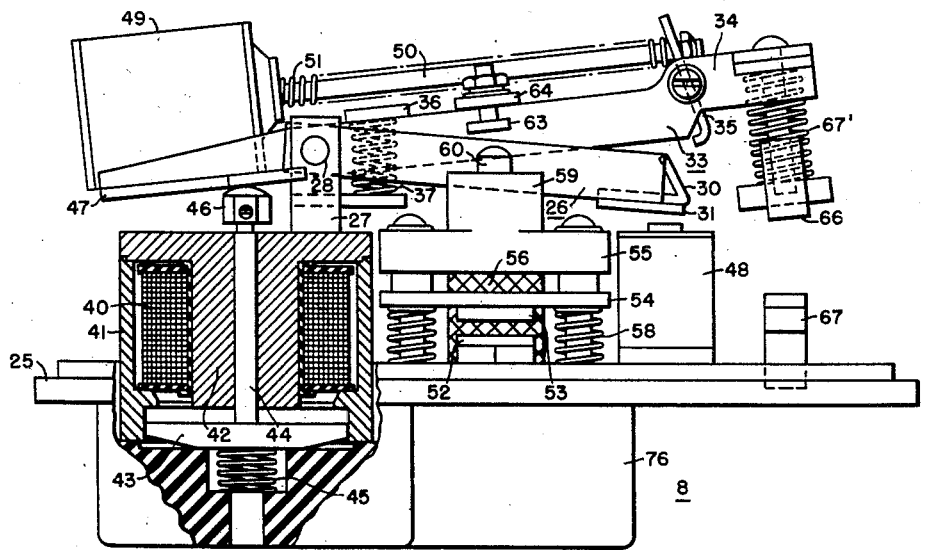

A trip coil 49 is mounted on the platform 47 at the end of the lever 33 to actuate the latch member 35. Any suitable means may be used for this purpose, and as shown in the drawings, a rod 50 is provided which is connected to the latch member 35 and moved longitudinally when the coil 49 is energized. A compression spring 51 is placed on the rod 50 to normally hold the latch in the position shown in Fig. 3, in engagement with the latch bar 30 of the movable member 26. It will be seen that when the coil 49 is energized, the rod 50 is moved longitudinally against the force of the spring 51 to move the latch 35 about its pivot and release the lever 33 from the movable member 26, so that it is moved by the spring 37 into the opened or tripped position of the contactor, even though the movable member 26 is still held in the closed position by the holding coil 48, as shown in Fig. 5.

The contactor 8 has two identical sets of main contacts mounted on the base 25 on opposite sides of the movable member 26. As shown particularly in Figs. 3 and 4, each set of main contacts comprises a stationary contact 52 mounted on the base 25 and a cooperating movable contact 53. The movable contact 53 is mounted on a conducting clamping member 54 and a heavy flexible conductor 56 which may, for example, be of braided copper, is clamped between the clamping member 54 and an upper clamping member 55. The clamping members 54 and 55, with the conductor 56 clamped between them, are movably mounted on guide bolts 57 on the base 25 and supported on springs 58 which bias the contacts apart. The upper clamping member 55 is molded of insulating material and has a central hollow projection 59 which contains a contact actuating button 60 supported on a spring 61. The hollow projection 59 also has an extension 62 extending towards the center of the base 25.

The contacts 52 and 53 are actuated to closed position by means of buttons 63 carried on a transverse arm 64 on the lever 33. Auxiliary buttons 65 are also carried on the arm 64 in position to engage the extensions 62. When the movable member 26 and lever 33 are moved clockwise about the pivot pin 28 by energization of the coil 40, the buttons 63 and 65 engage the contact actuating buttons 60 and extensions 62 and move the main contacts 52 and 53 into engagement. The movable contacts 53 of the two sets of main contacts are connected in series by the conductor 56, which extends across the base 25. The purpose of the extensions 62 and the spring mounting of the movable contact assemblies is to provide a rolling action when the contacts move into and out of engagement, thus preventing freezing of the contacts.

In order to provide for the interruption of relatively heavy currents, arcing tips 66 are provided on the extreme end of the lever 33, preferably being mounted on the lever by springs 67'. The arcing tips 66 are adapted to engage fixed contacts 67 on the base 25, and are disposed within arc boxes 68 of any desired type, the arcing tips 66 and contacts 67 being electrically in parallel with the main contacts. Thus, when the main contacts are separated, the current is transferred to the arcing tips and interrupted in the arc boxes 68. This arrangement makes it possible to design the contactor in the manner shown in the drawings with a very short travel for the main contacts, which permits the use of high operating forces for the main contacts to minimize contact resistance when the contacts are closed and to prevent freezing of the contacts. The arcing tips have relatively long travel, however, providing a considerable spacing to facilitate interrupting arcs, and high currents are readily interrupted.

The contactor is closed, as previously described, by energizing the closing coil 40, which moves the movable member 26 and the lever 33 latched thereto to actuate both sets of contacts 52 and 53 to closed position. The contactor is held in this position by energizing the holding coil 48, which holds the movable member 26 in its actuated position after the main coil 40 is deenergized. The contacts are opened by deenergizing the holding coil 48 to permit the spring 37 to return the movable member to the open position. The contacts may also be opened by energizing the trip coil 49 to release the latch 35 and permit the lever 33 to move to the open position independently of the movable member 26. It will be noted that the contactor is self-resetting, after it has been tripped by the coil 49, since when the closing coil 40 is again energized, the lever 33 will be moved clockwise and the latch 35 will again engage the latch bar 30 to latch the lever 33 to the movable member 26. The holding coil 48 is preferably so designed that it has a relatively high time constant, as compared to the coil 49, so that the contacts are opened much more rapidly by energization of the trip coil 49 than they are by deenergization of the coil 48, and substantially instantaneous tripping is thus obtained.

The contactor is also provided with auxiliary contacts 69 and 70 which may be mounted on opposite sides of the housing 41 of the closing coil, as shown. The auxiliary contacts may be of any suitable type and have not been shown in detail. The auxiliary contacts are actuated by contact buttons 71 disposed to be engaged by actuating buttons 72 carried on the platform 47, so that the auxiliary contacts are actuated whenever the contactor is opened or closed. For the purpose of the present invention, the auxiliary contacts are arranged so that the contact 69 is a normally open contact, and the contact 70 is a normally closed contact, although it will be understood that any suitable contact arrangement might be used.

A polarized relay 75 is mounted on the base 25 in a central recess 76 formed in the base. The polarized relay 75 may be of any suitable type and is shown as comprising a magnetic circuit 77 and an operating coil 78, with a contact assembly generally indicated at 79. The relay 75 is mounted on the base 25 between the two main contact assemblies and the flexible conductor 56, which connects the movable contacts, passes through the magnetic circuit 77 of the relay and is arranged to cooperate with it, so that the relay may be actuated by current flowing in the conductor 56. The relay is adjusted so that it responds to a higher value of current in the conductor 56 than in the main operating coil 78.

Referring now to Figure 1, the contactor 8 is connected, as shown, with the two sets of main contacts 52 and 53 in series between the feeder conductor 6 and the load bus 7 to connect the generator 1 to the bus. It will be noted that the flexible connection 56 between the two movable contacts of the contactor permits one contact to open even though the other one may have become frozen, thus insuring disconnection of the generator when desired.

The contactor 8 is controlled by a differential polarized relay 80, and by the polarized relay 75 previously described. The relay 80 has a differential voltage coil 81, which is connected to the feeder conductor 6 through the conductor 17. The other end of the coil 81 is connected through a contact 82 of the equalizer relay 21 to the bus 7 by means of a conductor 83. A high resistance 84 may, if desired, be connected across the contact 82 in series with the coil 81. The differential relay 80 also has a reverse current coil 85 which is connected, as shown, across the series field winding 4 of the generator 1 to respond to the load current through the generator. The contact 86 of the relay 80 is connected through a contact 87 of the field relay 13 to the operating coil 78 of the polarized relay 75, the other end of the coil 78 being connected to ground. The polarized relay 75 has two contacts, a normally open contact 88 and a normally closed contact 89. The normally open contact 88 is connected to the holding coil 48 of the contactor 8 and through the auxiliary contact 70 to the closing coil 40. The normally closed contact 89 of the relay 75 is connected through the auxiliary contact 69 to the trip coil 49 of the contactor.

The field relay 13, previously mentioned, may be of any suitable type, but is preferably a latch type device which is provided with a closing coil 90 to actuate it to closed position and a latch mechanism 91 for retaining it in the closed position. A trip coil 92 releases the latch mechanism 91, when energized, to cause the field relay 13 to open its contacts.

A manual switch 93 is provided for controlling the operation of the system. The switch 93 may be any suitable type of manual switch having an "off" position and two positions designated as "on" and "reset" in the drawing, a double-pole, double-throw switch connected as shown being suitable. The closing coil 90 of the field relay 13 is connected to the "reset" contact of the switch, as shown, and the "on" contact of the switch is connected through conductor 94, field relay contact 12, and conductor 95 to the feeder conductor 6. The coil 22 of the equalizer relay 21 is also connected to the switch 93 for connection to the conductor 94 when the switch is in the "on" position.

An overvoltage relay 96 is provided for protection against generator overvoltage. The relay 96 has an operating coil 97 connected across the generator voltage through the conductor 98, field relay contact 12 and conductor 95. The contact 99 of the relay 96 is connected to complete a circuit from the conductor 98 to the trip coil 92 of the field relay 13. The overvoltage relay 96 is also provided with a bias coil 100 to obtain proper selectivity between generators, in the manner described and claimed in a patent to J. D. Miner et al. No. 2,590,265.

As more fully described in that patent, when one of a number of paralleled generators develops an overvoltage, the faulty generator cannot be detected from the bus voltage, and it is necessary to provide means for selecting the faulty generator. The bias coil 100 is provided for this purpose and is connected in the equalizer circuit, as shown, so that it is energized by the equalizer current. When an overvoltage condition occurs in one generator, the direction of current flow in the equalizer circuit is such that the bias coil of the overvoltage relay of the generator which is producing the overvoltage aids the energization of the main relay coil 97 and thus, lowers the voltage setting of the relay, so that the relay is actuated to effect disconnection of the generator. The bias coils of the overvoltage relays of the other generators are energized in the opposite direction so that, in effect, the voltage setting of those relays is raised and the good generators are prevented from being disconnected.

In addition to reverse current and overvoltage protection, it is also desirable and usually necessary to provide protection against faults in the generator itself or in its connecting conductors. For this purpose, a differential ground fault relay 101 is provided. The ground fault relay 101 has two opposing coils 102 and 103, which are energized in accordance with the currents on opposite sides of the generator 1. These coils may be energized in any desired manner, and as shown, the coil 102 is connected to a shunt 104 in series with the negative lead of the genereator 1, while the coil 103 is connected across a shunt 105 connected in the feeder conductor 6. It will be understood that under normal conditions, the currents on opposite sides of the generator will be equal, and since the coils 102 and 103 are connected to oppose each other, the relay 101 will not be actuated. If a ground fault occurs in the generator 1, however, or in the conductors between the shunts 104 and 105, the currents through the shunts will become unequal so that there will be a net force acting on the relay 101 to cause it to close its contact 106. The contact 106 is connected to the load bus 7 by conductors 107 and 83 and, when closed, completes a circuit to the trip coil 92 of the field relay 13.

Protection against reversed generator polarity is preferably also provided in the manner disclosed and claimed in a Miner et al. Patent No. 2,627,038. For this purpose, a rectifier 108 is connected between the conductor 98, which is connected to the generator voltage, and the field relay trip coil 92. The rectifier 108 is connected so that when the generator 1 has its correct polarity, the rectifier blocks current flow, but if the generator polarity becomes reversed for any reason, the rectifier will permit current to flow to the trip coil.

The operation of this system may be described as follows, the elements of the system being initially in their deenergized positions shown in Fig. 1. If the generator 1 is being driven by its prime mover and it is desired to bring it up to voltage and connect it to the bus, the manual switch 93 is first placed momentarily in the "reset" position. This connects the closing coil 90 of the field relay to the bus 7 and causes the field relay 13 to close its contacts. The field relay latches itself in closed position, so that the switch 93 can be released as soon as the field relay has closed. Closing of the field relay contacts 11 and 12 completes the circuit of the shunt field winding 3 of the generator 1, as previously described, so that the generator can build up its voltage.

When it is desired to connect the generator to the bus, the switch 93 is moved to the "on" position. In this position, the switch connects the coil 22 of the equalizer relay 21 to the generator voltage through conductor 94, field relay contact 12, and conductor 95. If the generator voltage is sufficiently high, the equalizer relay 21 is actuated, and closes its contacts 23 and 82. The contact 23 connects the paralleling coil 19 of the voltage regulator 10 to the equalizer bus 20, and the contact 82 shorts out the resistor 84, so that the differential voltage coil 81 of the differential relay 80 is connected directly to the bus 7 through conductor 83. The other end of the coil 81 is connected to the feeder conductor 6 through conductor 17, so that the coil 81 is connected directly across the open contacts of the contactor 8, and is energized by the voltage difference between the generator and the bus. The resistor 84 is used to protect the sensitive differential coil 81 while the voltage difference between the generator and bus is still relatively high, and if desired, this resistor could be omitted and the circuit of the differential coil interrupted by the equalizer relay contact 82.

The differential relay 80 is a polarized relay and is adjusted to actuate its contact 86 when the voltage of the generator is greater than the bus voltage by a predetermined amount, preferably of the order of 0.5 volt. When the relay 80 closes its contact 86, a circuit is completed from the feeder conductor 6, through the conductor 95, field relay contact 12, conductor 94, switch 93, conductor 109, relay contact 86, field relay contact 87, and coil 78 of the polarized relay 75 to ground. The relay 75 is thus actuated to close its contact 88 and open its contact 89. Closing of the contact 88 completes a circuit from the conductor 94 through the switch 93, conductor 110, relay contact 88, normally closed auxiliary contact 70, and closing coil 40 of the contactor 8 to ground, and through the holding coil 48 to ground. The closing coil and the holding coil of the contactor 8 are thus energized, causing the contactor to close its main contacts to connect the generator to the bus 7. When the contactor closes, the normally closed auxiliary contact 70 opens to disconnect the closing coil, but the holding coil 48 remains energized and holds the contactor in closed position, as previously explained. The other auxiliary contact 69 closes but has no effect at this time, since the relay contact 89 is open. The system is now in its normal operating condition, with the generator 1 connected to the bus 7 and delivering its normal voltage under control of the voltage regulator 10.

If the generator voltage falls below the bus voltage for any reason, such as slowing down of the generator prime mover below the normal speed range, or an abnormal increase in the bus voltage, reverse current will flow from the bus to the generator. The reverse current coil 85 of the differential relay 80 is responsive to the direction of current flow through the generator and, upon the occurrence of a predetermined reverse current, the coil 85 will cause the relay to open its contact 86, deenergizing the coil 78 of the polarized relay 75, so that its contact 88 opens and deenergizes the holding coil 48 of the contactor 8, causing it to open its main contacts and disconnect the generator from the bus. It will be seen that when this occurs, the field relay 13 remains closed, so that the generator field circuit is not interrupted, and as soon as the generator voltage again exceeds the bus voltage, the generator will automatically be reconnected to the bus in the manner previously described.

If the differential relay 80 should fail to operate on reverse current, the generator 1 might be seriously damaged by the reverse current, and the entire system might be adversely affected by the excessive current drawn from the other generators. To prevent this possibility, the polarized relay 75 provides back-up protection. As previously explained, the flexible conductor 56, which connects the main contacts of the contactor 8, passes through the magnetic circuit of the relay 75. If the relay 86 fails to operate, reverse current flowing through the conductor 56 will actuate the relay 75 to open the contact 88 and close the contact 89. This completes a circuit from the conductor 94 through the switch 93, conductor 109, contact 86 of the relay 80, which has remained closed, contact 87 of the field relay, contact 89 of relay 75, and auxiliary contact 69, which is now closed, to the trip coil 49 of the contactor 8, to effect instantaneous opening of the contactor. At the same time, a circuit is completed from the relay contact 89 and auxiliary contact 69 through the conductor 111 to the trip coil 92 of the field relay 13, the other side of the trip coil 92 being connected to the negative side of the generator by conductor 112. Thus, if the relay 80 fails to operate on reverse current, the polarized relay 75 effects instantaneous tripping of the contactor 8 and opening of the field relay 13 to interrupt the generator field circuit, so that the generator 1 is immediately removed from the bus and its field deenergized.

Assuming that the system is in its normal operating condition, with the main contactor 8 closed, if the generator 1 develops an overvoltage for any reason, such as failure of the regulator 10, the overvoltage relay 96 will close its contact 99. This completes a circuit from the conductor 94 through the conductor 98 and relay contact 99 to the field relay trip coil 92, and also through the conductor 111 to the trip coil 49 of the contactor 8. Thus, overvoltage of the generator 1 causes immediate disconnection of the generator and deenergization of its field.

Overvoltage of one generator in the system results in raising the bus voltage, so that reverse current flows from the bus through the normal generators. This, of course, results in actuation of the differential relays 80 of the normal generators to disconnect them in response to the reverse current. As previously explained, however, the holding coil 48 of the contactor 8 is designed to have a relatively high time constant, so that the instantaneous tripping of the contactor 8 of the faulty generator, by the trip coil 49, results in disconnecting that generator from the bus before the holding coils of the contactors of the other generators have had time to release their contactors. Thus, the faulty generator is removed from the bus before the contactors of the other generators have had time to operate, and the generator which is producing overvoltage is removed from the bus without even momentary disconnection of the good generators. This is an important feature of the invention since continuous and uninterrupted service is required and the operation of the present system makes it possible to obtain uninterrupted service, even under the conditions described.

In the event of a ground fault in the generator, or in its connections between the shunts 104 and 105, the ground fault relay 101 closes its contact 106, to energize the trip coil 92 of the field relay, and the contactor trip coil 49, from the bus 7 through conductors 83 and 107 and relay contact 106 to the trip coil 92, and through conductor 111 to the contactor trip coil 49. Similarly, if the generator attempts to build up with reversed polarity, or if its polarity becomes reversed during operation, the rectifier 108 will permit current to flow from the conductor 98 to the field relay trip coil 92 and the contactor trip coil 49, effecting disconnection of the generator and deenergization of its field. In order to correct such a condition, a tickler resistor 113 is preferably connected, as shown, between the shunt field winding 3 and the bus, so that a small current can flow from the bus to the field winding to build up the residual magnetism in the correct direction, so that the generator voltage will build up with correct polarity.

It should now be apparent that a control and protective system has been provided, which includes a circuit control device or contactor of novel construction, and which provides complete control and protection for a direct-current generator operating in parallel with other generators in such a manner that great reliability is provided, since the system is completely protected against any abnormal conditions in the generator, and the generator itself is disconnected and its field circuit deenergized upon the occurrence of such conditions. This result is accomplished in a highly reliable manner and without unnecessarily removing other generators in the system from the bus upon the occurrence of overvoltage or other abnormal conditions in one generator. It will be noted that when the generator is removed from the bus by action of the relay 80 in response to reverse current, the field relay is not tripped so that the generator is automatically reconnected to the bus as soon as its voltage becomes high enough. When the generator is disconnected in response to fault conditions or by the back-up relay 75, however, the tripping is instantaneous and the field relay is also tripped at the same time, so that the generator voltage drops to the residual value. The generator cannot then be reconnected to the bus except by first manually actuating the switch 93 to the "reset" position, and the system is thus electrically trip free.

A preferred embodiment of the invention has been described with particular reference to an aircraft electrical system. It will be understood that the invention is not necessarily limited to this particular application, and that various modifications may be made within the scope of the invention. Thus, a ground return circuit is shown, as is customary in aircraft practice, but if desired, a wire return circuit might be utilized. The contactor 8, as shown, is particularly adapted for the particular application described, but it will be evident that it may readily be adapted for other applications. It will be understood, therefore, that the invention is not limited to the specific details of the preferred embodiment shown, but in its broadest aspects it includes all equivalent embodiments and modifications.

I claim as my invention:

1. A control and protective system for a direct-current generator having a field winding, said system comprising electrically operated switch means for connecting the generator to a load bus, said switch means including electrically energized holding means for holding the switch means in closed position, differential relay means responsive to the voltage difference between the generator and the bus for effecting closing of the switch means and energization of the holding means, said differential relay means also being responsive to reverse current flowing from the bus to the generator to effect deenergization of the holding means in response to reverse current to allow the switch means to open, and a polarized relay responsive to reverse current for effecting substantially instantaneous opening of the switch means independently of the holding means.

2. A control and protective system for a direct-current generator having a field winding, said system comprising electrically operated switch means for connecting the generator to a load bus, said switch means including electrically energized holding means for holding the switch means in closed position, differential relay means responsive to the voltage difference between the generator and the bus for effecting closing of the switch means and energization of the holding means, said differential relay means also being responsive to reverse current flowing from the bus to the generator to effect deenergization of the holding means in response to reverse current to allow the switch means to open, and a polarized relay responsive to reverse current for effecting substantially instantaneous opening of the switch means independently of the holding means and interruption of the circuit of the generator field winding.

3. A control and protective system for a direct-current generator having a field winding, said system comprising electrically operated switch means for connecting the generator to a load bus, said switch means including electrically energized holding means for holding the switch means in closed position, differential relay means responsive to the voltage difference between the generator and the bus for effecting closing of the switch means and energization of the holding means, said differential relay means also being responsive to reverse current flowing from the bus to the generator to effect deenergization of the holding means in response to reverse current to allow the switch means to open, and a polarized relay responsive to reverse current for effecting substantially instantaneous opening of the switch means independently of the holding means and interruption of the circuit of the generator field winding, the polarized relay being adjusted to operate on a higher value of reverse current than the differential relay means.

4. A control and protective system for a direct-current generator having a field winding, said system comprising electrically operated switch means for connecting the generator to a load bus, said switch means including electrically energized holding means for holding the switch means in closed position, differential relay means responsive to the voltage difference between the generator and the bus for effecting closing of the switch means and energization of the holding means, said differential relay means also being responsive to reverse current flowing from the bus to the generator to effect deenergization of the holding means in response to reverse current to allow the switch means to open, and a voltage relay responsive to the generator voltage, said voltage relay being adapted to effect substantially instantaneous opening of the switch means independently of the holding means and interruption of the circuit of the generator field winding in response to generator voltage in excess of a predetermined value.

5. A control and protective system for a direct-current generator having a field winding, said system comprising electrically operated switch means for connecting the generator to a load bus, said switch means including electrically energized holding means for holding the switch means in closed position, a field relay for controlling the circuit of the generator field winding, said field relay being normally closed and having electrically energized tripping means, differential relay means responsive to the voltage difference between the generator and the bus for effecting closing of the switch means and energization of the holding means, said differential relay means also being responsive to reverse current flowing from the bus to the generator to effect deenergization of the holding means in response to reverse current to allow the switch means to open, and a polarized relay responsive to reverse current for effecting substantially instantaneous opening of the switch means independently of the holding means and for simultaneously effecting energization of the field relay tripping means.

6. A control and protective system for a direct-current generator having a field winding, said system comprising electrically operated switch means for connecting the generator to a load bus, said switch means including electrically energized holding means for holding the switch means in closed position, differential relay means responsive to the voltage difference between the generator and the bus, a polarized relay for effecting closing of the switch means and energization of the holding means, said differential relay means controlling the polarized relay to effect operation thereof when said voltage difference has a predetermined magnitude and direction, the differential relay means also being responsive to reverse current flowing from the bus to the generator to cause the polarized relay to effect deenergization of the holding means to allow the switch means to open, and the polarized relay being responsive to a higher value of reverse current to effect substantially instantaneous opening of the switch means independently of the holding means.

7. A control and protective system for a direct-current generator having a field winding, said system comprising electrically operated switch means for connecting the generator to a load bus, said switch means including electrically energized holding means for holding the switch means in closed position, a field relay for controlling the circuit of the generator field winding, said field relay being normally closed and having electrically energized tripping means, differential relay means responsive to the voltage difference between the generator and the bus, and a polarized relay for effecting closing of the switch means and energization of the holding means, said differential relay means controlling the polarized relay to effect operation thereof when said voltage difference has a predetermined magnitude and direction, the differential relay means also being responsive to reverse current flowing from the bus to the generator to cause the polarized relay to effect deenergization of the holding means to allow the switch means to open, the polarized relay being responsive to a higher value of reverse current to effect substantially instantaneous opening of the switch means independently of the holding means and to effect energization of the field relay tripping means.

8. A control and protective system for a direct-current generator having a field winding, said system comprising electrically operated switch means for connecting the generator to a load bus, said switch means including electrically energized holding means for holding the switch means in closed position, a field relay for controlling the circuit of the generator field winding, said field relay being normally closed and having electrically operated tripping means, differential relay means responsive to the voltage difference between the generator and the bus for effecting closing of the switch means and energization of the holding means, said differential relay means also being responsive to reverse current flowing from the bus to the generator to effect deenergization of the holding means in response to reverse current to allow the switch means to open, means responsive to a higher value of reverse current for effecting simultaneously instantaneous opening of the switch means independently of the holding means and for simultaneously effecting energization of the field relay tripping means, and a voltage relay responsive to the generator voltage for effecting substantially instantaneous opening of the switch means independently of the holding means and for simultaneously effecting energization of the field relay tripping means in response to generator voltage in excess of a predetermined value.

9. A control and protective system for a direct-current generator having a field winding, said system including switch means for connecting the generator to a load bus, the switch means having a closing coil for closing the switch, a holding coil effective when energized for holding the switch in closed position, and tripping means for effecting opening of the switch independently of the holding coil, the switch being adapted to open more rapidly when opened by energization of the tripping means than when opened by deenergization of the holding coil, polarized differential relay means responsive to the voltage difference between the generator and the bus for effecting energization of the closing coil and holding coil of the switch means when said voltage difference has a predetermined magnitude and direction, the closing coil being deenergized upon closure of the switch, said differential relay means also being responsive to reverse current flowing from the bus to the generator for effecting deenergization of the holding coil to allow the switch to open, and a second polarized relay responsive to a higher value of reverse current for energizing said tripping means and for effecting interruption of the generator field winding circuit.

10. A control and protective system for a direct-current generator having a field winding, said system including switch means for connecting the generator to a load bus, the switch means having a closing coil for closing the switch, a holding coil effective when energized for holding the switch in closed position, and tripping means for effecting opening of the switch independently of the holding coil, the switch being adapted to open more rapidly when opened by energization of the tripping means than when opened by deenergization of the holding coil, a field relay for controlling the circuit of the generator field winding, said field relay being normally closed and having electrically energized tripping means, polarized differential relay means responsive to the voltage difference between the generator and the bus for effecting energization of the closing coil and holding coil of the switch means when said voltage difference has a predetermined magnitude and direction, the closing coil being deenergized upon closure of the switch, said differential relay means also being responsive to reverse current flowing from the bus to the generator for effecting deenergization of the holding coil to allow the switch to open, and a second polarized relay responsive to a higher value of reverse current for energizing both the tripping means of the switch and the tripping means of the field relay.

11. A control and protective system for a direct-current generator having a field winding, said system including switch means for connecting the generator to a load bus, the switch means having a closing coil for closing the switch, a holding coil effective when energized for holding the switch in closed position, and tripping means for effecting opening of the switch independently of the holding coil, the switch being adapted to open more rapidly when opened by energization of the tripping means than when opened by deenergization of the holding coil, a field relay for controlling the circuit of the generator field winding, said field relay being normally closed and having electrically energized tripping means, polarized differential relay means responsive to the voltage difference between the generator and the bus for effecting energization of the closing coil and holding coil of the switch means when said voltage difference has a predetermined magnitude and direction, the closing coil being deenergized upon closure of the switch, said differential relay means also being responsive to reverse current flowing from the bus to the generator for effecting deenergization of the holding coil to allow the switch to open, and a voltage relay responsive to the generator voltage, said voltage relay being connected to effect energization of both the tripping means of the switch and the tripping means of the field relay in response to generator voltage in excess of a predetermined value.

12. A control and protective system for a direct-current generator having a field winding, said system including switch means for connecting the generator to a load bus, the switch means having a closing coil for closing the switch, a holding coil effective when energized for holding the switch in closed position, and tripping means for effecting opening of the switch independently of the holding coil, the switch being adapted to open more rapidly when opened by energization of the tripping means than when opened by deenergization of the holding coil, a field relay for controlling the circuit of the generator field winding, said field relay being normally closed and having electrically energized tripping means, polarized differential relay means responsive to the voltage difference between the generator and the bus for effecting energization of the closing coil and holding coil of the switch means when said voltage difference has a predetermined magnitude and direction, the closing coil being deenergized upon closure of the switch, said differential relay means also being responsive to reverse current flowing from the bus to the generator for effecting deenergization of the holding coil to allow the switch to open, a second polarized relay responsive to a higher value of reverse current for energizing both the tripping means of the switch and the tripping means of the field relay, and a voltage relay responsive to the generator voltage, said voltage relay being connected to effect energization of both the tripping means of the switch and the tripping means of the field relay in response to generator voltage in excess of a predetermined value.

13. A control and protective system for a direct-current generator having a field winding, said system including switch means for connecting the generator to a load bus, the switch means having a closing coil for closing the switch, a holding coil effective when energized for holding the switch in closed position, and tripping means for effecting opening of the switch independently of the holding coil, the switch being adapted to open more rapidly when opened by energization of the tripping means than when opened by deenergization of the holding coil, a field relay for controlling the circuit of the generator field winding, said field relay being normally closed and having electrically energized tripping means, polarized differential relay means responsive to the voltage difference between the generator and the bus for effecting energization of the closing coil and holding coil of the switch means when said voltage difference has a predetermined magnitude and direction, the closing coil being deenergized upon closure of the switch, said differential relay means also being responsive to reverse current flowing from the bus to the generator for effecting deenergization of the holding coil to allow the switch to open, a second polarized relay responsive to a higher value of reverse current for energizing both the tripping means of the switch and the tripping means of the field relay, a voltage relay responsive to the generator voltage and adapted to be actuated when said voltage exceeds a predetermined value, and a fault responsive relay adapted to be actuated in response to a fault in the generator, said voltage relay and fault responsive relay each being connected to effect energization of both the tripping means of the switch and the tripping means of the field relay.

14. In a control system for a direct-current generator, switch means for connecting the generator to a load bus, said switch means comprising a movable member, a lever pivotally mounted on the movable member, contact means adapted to be actuated to closed position by movement of said lever, latching means for latching the lever to the movable member for movement therewith, a closing coil adapted when energized to effect movement of the lever to actuate the contacts to closed position, a holding coil adapted when energized to hold the movable member in position, and tripping means for releasing said latch means to permit the lever to move independently of the movable member to effect separation of the contacts, differential relay means responsive to the voltage difference between the generator and the bus for effecting energization of the closing coil and the holding coil, the switch means including means for effecting deenergization of the closing coil upon closing of the switch means, said relay means also being responsive to reverse current flowing from the bus to the generator to effect deenergization of the holding coil to effect opening of the contacts, and a polarized relay responsive to a higher value of reverse current to effect energization of said tripping means.

15. In a control system for a direct-current generator, switch means for connecting the generator to a load bus, said switch means comprising a movable member, a lever pivotally mounted on the movable member, contact means adapted to be actuated to closed position by movement of said lever, latching means for latching the lever to the movable member for movement therewith, a closing coil adapted when energized to effect movement of the lever to actuate the contacts to closed position, a holding coil adapted when energized to hold the movable member in position, and tripping means for releasing said latch means to permit the lever to move independently of the movable member to effect separation of the contacts, the switch means being adapted to open the contacts more rapidly upon energization of the tripping means than upon deenergization of the holding coil, differential relay means responsive to the voltage difference between the generator and the bus for effecting energization of the closing coil and the holding coil, the switch means including means for effecting deenergization of the closing coil upon closing of the switch means, said relay means also being responsive to reverse current flowing from the bus to the generator to effect deenergization of the holding coil to effect opening of the contacts, a polarized relay responsive to a higher value of reverse current to effect energization of said tripping means, and a voltage relay responsive to the generator voltage for effecting energization of the tripping means in response to generator voltage in excess of a predetermined value.

16. A circuit control device comprising a base, a movable member pivotally mounted on the base, a lever pivotally mounted on the movable member, separate contact means mounted on the base on opposite sides of the movable member, each of the contact means including a stationary and a movable contact, a flexible conductor connecting the movable contacts of the two contact means, said lever having means thereon for actuating both contact means to closed position when the lever is moved toward the contact means, spring means biasing the lever away from the contact means, latching means for latching the lever to the movable member for movement therewith, a closing coil adapted when energized to effect movement of the lever toward the contact means to actuate the contacts to closed position, a holding coil adapted when energized to hold the movable member in position to maintain the contacts closed, and a tripping coil carried on said lever, said tripping coil being adapted when energized to actuate the latch means to release the lever to permit the lever to move independently of the movable member to effect opening of the contacts.

17. A circuit control device comprising a base, a movable member pivotally mounted on the base, a lever pivotally mounted on the movable member, separate contact means mounted on the base on opposite sides of the movable member, each of the contact means including a stationary and a movable contact, spring means supporting the movable contacts for movement toward and away from the stationary contacts, a flexible conductor connecting the movable contacts of the two contact means, said lever having means thereon for actuating both contact means to closed position when the lever is moved toward the contact means, said actuating means being adapted to give the movable contact a rolling motion as it moves into and out of engagement with the stationary contact, spring means biasing the lever away from the contact means, latching means for latching the lever to the movable member for movement therewith, a closing coil adapted when energized to effect movement of the lever toward the contact means to actuate the contacts to closed position, a holding coil adapted when energized to hold the movable member in position to maintain the contacts closed, and a tripping coil carried on said lever, said tripping coil being adapted when energized to actuate the latching means to release the lever to permit the lever to move independently of the movable member to effect opening of the contacts.

18. A circuit control device comprising a base, a movable member pivotally mounted on the base, a lever pivotally mounted on the movable member, separate contact means mounted on the base on opposite sides of the movable member, each of the contact means including a stationary and a movable contact, a flexible conductor connecting the movable contacts of the two contact means, a relay mounted on the base between the two contact means, said relay having a magnetic circuit associated with the flexible conductor so that the relay responds to current in the conductor, said lever having means thereon for actuating both contact means to closed position when the lever is moved toward the contact means, spring means biasing the lever away from the contact means, latching means for latching the lever to the movable member for movement therewith, a closing coil adapted when energized to effect movement of the lever toward the contact means to actuate the contacts to closed position, a holding coil adapted when energized to hold the movable member in position to maintain the contacts closed, and a tripping coil carried on said lever, said tripping coil being adapted when energized to actuate the latching means to release the lever to permit the lever to move independently of the movable member to effect opening of the contacts.

19. A circuit control device comprising a base, a movable member pivotally mounted on the base, a lever pivotally mounted on the movable member, separate contact means mounted on the base on opposite sides of the movable member, each of the contact means including a stationary and a movable contact, a flexible conductor connecting the movable contacts of the two contact means, a polarized relay mounted on the base between the two contact means, said relay having a magnetic circuit associated with the flexible conductor so that the relay responds to the magnitude and direction of current in the conductor, said lever having means thereon for actuating both contact means to closed position when the lever is moved toward the contact means, spring means biasing the lever away from the contact means, latching means for latching the lever to the movable member for movement therewith, a closing coil adapted when energized to effect movement of the lever toward the contact means to actuate the contacts to closed position, a holding coil adapted when energized to hold the movable member in position to maintain the contacts closed, and a tripping coil carried on said lever, said tripping coil being adapted when energized to actuate the latching means to release the lever to permit the lever to move independently of the movable member to effect opening of the contacts, the control device being adapted to effect opening of the contacts more rapidy upon energization of the tripping coil than upon deenergization of the holding coil.

References Cited in the file of this patent
UNITED STATES PATENTS

| | | |
|---|---|---|
| 767,140 | Feher | Aug. 9, 1904 |
| 951,852 | Smith et al. | Mar. 15, 1910 |
| 1,084,104 | Palmer | Jan. 13, 1914 |
| 1,190,060 | Wolf | July 4, 1916 |
| 1,658,329 | Forsberg | Feb. 7, 1928 |
| 1,813,181 | MacNeill | July 7, 1931 |
| 2,534,895 | Austin et al. | Dec. 19, 1950 |
| 2,666,871 | Austin et al. | Jan. 19, 1954 |
| 2,689,316 | Gillespie | Sept. 14, 1954 |

FOREIGN PATENTS

| | | |
|---|---|---|
| 599,909 | Germany | July 11, 1934 |

OTHER REFERENCES

"D. C. 24-Volt Aircraft Electrical Systems," Westinghouse Engineer, vol. 10, No. 5, pp. 212–216, September 1950.